United States Patent
English

[15] 3,673,711
[45] July 4, 1972

[54] METHOD OF AND APPARATUS FOR VISUAL INSTRUCTION

[72] Inventor: Dolores J. English, Split Rock Road, Syosset, N.Y. 11791

[22] Filed: Jan. 4, 1971

[21] Appl. No.: 103,492

[52] U.S. Cl. .................................................35/62, 35/8 R
[51] Int. Cl.............................................................B43l 1/12
[58] Field of Search ......................35/7 R, 7 A, 8 R, 26, 31 F, 35/35 H, 40, 60, 61, 62, 63, 66; 40/140, 142 A, 219; 161/3, 3.5, 409; 283/34; 353/11, 44

[56] References Cited

UNITED STATES PATENTS

| | | | |
|---|---|---|---|
| 1,291,370 | 1/1919 | Beaven | 40/140 |
| 1,312,961 | 8/1919 | De Voe | 283/34 X |
| 2,714,199 | 7/1955 | Adams | 353/11 X |

FOREIGN PATENTS OR APPLICATIONS

| | | |
|---|---|---|
| 634,975 | 1/1962 | Canada |
| 553,492 | 5/1943 | Great Britain |

*Primary Examiner*—Harland S. Skogquist
*Attorney*—Laurence B. Dodds

[57] ABSTRACT

An apparatus for visual instruction comprises a substantially planar translucent screen having an observation surface and a reverse surface, a writing instrument for writing alphanumeric characters on one surface of the screen with an erasable writing medium, and means for illuminating the observation surface of the screen. The instruction apparatus further comprises means for enhancing the visibility of selected characters with respect to the rest, for example a series of reflecting blocks of white Styrofoam, of dimensions corresponding to predetermined characters and groups of characters, such blocks being adapted to be held on the reverse surface of the screen in registration with a selected character or characters.

3 Claims, 2 Drawing Figures

METHOD OF AND APPARATUS FOR VISUAL INSTRUCTION

BACKGROUND OF THE INVENTION

It is customary in the instruction of students with the aid of a blackboard for the teacher to stand in front of the board while writing upon it. This usually not only obstructs the portion of the blackboard being written upon from the students' view but it tends to attract the attention of the students to the teacher and to distract their attention from the subject matter being written on the board. These factors are particularly troublesome in the instruction of young children, for example in grades one to three and children with minimal brain damage resulting in perceptual handicaps. Furthermore, young children sometimes tend to confuse background and foreground. For example, in textbooks the printing is black on a white background while in writing on a blackboard this relationship is reversed and often confuses a young child. In addition, the teacher's back is turned to the class so that she cannot readily note the extent to which the class is following or monitor discipline. In some cases, the teacher may desire to put an entire lesson on the screen before the class while, at the same time, avoiding possible distraction of the students by the material of the entire lesson and assisting in concentration of the student on one or more words at a time.

SUMMARY OF THE INVENTION

In accordance with the invention, a method of visual instruction utilizing a substantially planar translucent screen having an observation surface and a reverse surface comprises writing alphanumeric characters on one surface of the screen with an erasable writing medium; illuminating the observation surface of the screen; and enhancing the visibility of selected characters with respect to the rest by holding a reflecting block on the reverse surface of the screen having dimensions and disposed to register with a selected character or characters.

Further in accordance with the invention, an apparatus for visual instruction comprises a substantially planar translucent screen having an observation surface and a reverse surface, a writing instrument for depositing an erasable writing medium on one surface of the screen to form alphanumeric characters, means for illuminating the observation surface of the screen, and means for enhancing the visibility of selected characters with respect to the rest, for example a series of reflecting blocks of dimensions corresponding to predetermined characters and groups of characters, such blocks being adapted to be held on the reverse surface of the screen in registration with a selected character or characters.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

FIG. 1 is a perspective view of a visual instruction apparatus embodying the invention and suitable for practicing the method of the invention, while

DESCRIPTION OF THE PREFERRED EMBODIMENT

Figure 1:
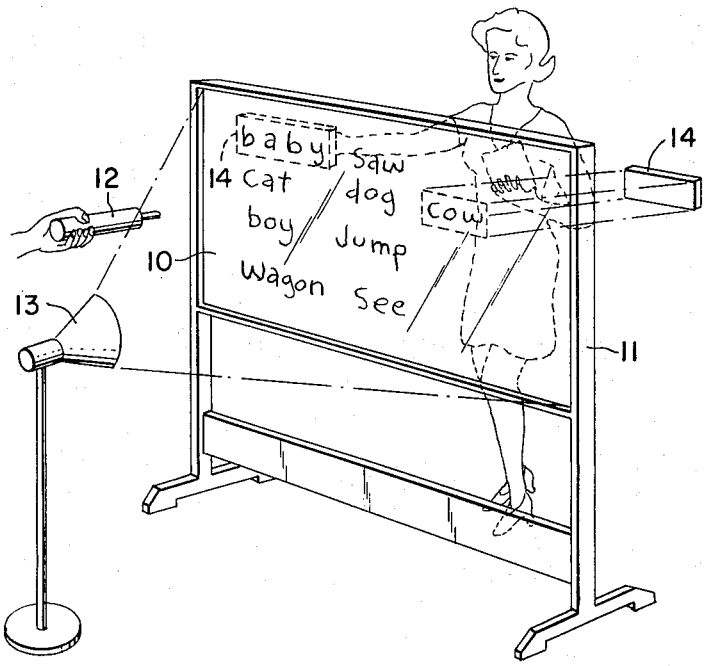

Referring now more particularly to FIG. 1 of the drawing, there is represented an apparatus for visual instruction which comprises a substantially planar translucent screen 10 mounted in a standard 11 and having a front observation surface and a reverse surface. The apparatus further comprises a writing instrument 12, preferably in the form of a broad-tip felt marking pen, for writing alphanumeric characters on one surface of the screen 10, for example the observation surface, with an erasable writing medium such as a water-soluble ink.

The term "alphanumeric characters" is used in its general sense to include alphabetical characters, numerals, and related shapes and forms. The apparatus includes means for illuminating the observation surface of the screen which may be in the form of a floodlight 13 although if the room illumination is sufficient, the floodlight may be omitted. The significant factor in respect to the illumination is that intensity of light emission from the observation surface of the screen be greater than that transmitted through the screen from the region behind it.

Figure 2:
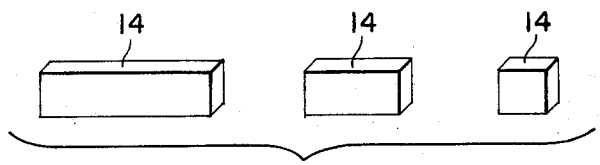
FIG. 2 is a perspective view of a series of blocks for use in the apparatus of FIG. 1.

The instruction apparatus further comprises means for enhancing the visibility of selected characters with respect to the rest. As shown in FIG. 2, this means may be in the form of a series of blocks 14 of reflecting material, for example white styrofoam, of dimensions corresponding to predetermined characters or groups of characters. The teacher selects a block of appropriate size and holds it on the reverse surface of the screen in registration with a selected character or characters, thereby enhancing its visibility.

Thus, with the visual instruction apparatus described, the teacher may desire to put an entire lesson on the screen before the class in order to save instruction time. At the same time, in order to avoid possible distraction of the students by the material of the entire lesson and to assist in the concentration of the students on one or more words at a time, the teacher selects a reflective block 14 of the appropriate size and holds it against the reverse side of the screen, thereby enhancing its visibility with respect to the rest of the lesson.

Further in the use of the visual instruction apparatus described, the teacher stands behind the screen 10 and in no way obstructs the students' view of the lesson. At the same time, the teacher can face the class, looking over the screen 10, to determine whether or not the instruction is being properly followed and also to monitor discipline. In addition, the resultant lesson is written in black on a white background, as in the case of ordinary textbooks, and this tends to minimize confusion sometimes encountered by young children when using white chalk on a blackboard, which is the reverse of the usual textbook.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. The method of visual instruction utilizing a substantially planar translucent screen having an observation surface and a reverse surface comprising:

writing alphanumeric characters on one surface of the screen with an erasable writing medium;

illuminating the observation surface of the screen;

and enhancing the visibility of selected characters with respect to the rest by holding a reflecting block on the reverse surface of the screen having dimensions and disposed to register with a selected character or characters.

2. An apparatus for visual instruction comprising:

a substantially planar translucent screen having an observation surface and a reverse surface;

a writing instrument for depositing an erasable writing medium on one surface of the screen to form alphanumeric characters;

means for illuminating the observation surface of the screen;

and a series of reflecting blocks of dimensions corresponding to predetermined characters and groups of characters, such blocks being adapted to be held on the reverse surface of said screen in registration with a selected character or characters to enhance the visibility of such characters.

3. An apparatus for visual instruction in accordance with claim 2 in which said reflecting blocks are of white foamed plastic.

* * * * *